US008199697B2

(12) United States Patent
McNamara et al.

(10) Patent No.: US 8,199,697 B2
(45) Date of Patent: *Jun. 12, 2012

(54) SHARING DATA WITH AN EMERGENCY RESPONSE SERVICE OVER A MOBILE NETWORK

(75) Inventors: Justin Michael McNamara, Atlanta, GA (US); Jeffrey Clinton Mikan, Cumming, GA (US); Carolyn Tuthill, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 306 days.

This patent is subject to a terminal disclaimer.

(21) Appl. No.: 11/583,054

(22) Filed: Oct. 19, 2006

(65) Prior Publication Data

US 2008/0095098 A1  Apr. 24, 2008

(51) Int. Cl.
*H04W 4/00* (2009.01)
(52) U.S. Cl. .................. 370/328; 370/338; 370/352
(58) Field of Classification Search .......... 455/404, 455/414, 456, 418; 340/988; 370/310, 350, 370/428, 348, 229, 477, 338
See application file for complete search history.

(56) References Cited

U.S. PATENT DOCUMENTS

| | | | | |
|---|---|---|---|---|
| 6,826,395 B2* | 11/2004 | Lee et al. | | 455/411 |
| 7,107,045 B1* | 9/2006 | Knoop | | 455/414.1 |
| 7,321,763 B2* | 1/2008 | Tanaka et al. | | 455/414.1 |
| 2001/0015965 A1* | 8/2001 | Preston et al. | | 370/338 |
| 2004/0068574 A1* | 4/2004 | Costa Requena et al. | | 709/230 |
| 2004/0192251 A1* | 9/2004 | Zhao et al. | | 455/404.1 |
| 2004/0203752 A1* | 10/2004 | Wojaczynski et al. | | 455/432.1 |
| 2004/0215974 A1* | 10/2004 | Conley et al. | | 713/201 |
| 2004/0240427 A1* | 12/2004 | Kohli et al. | | 370/351 |
| 2005/0002407 A1* | 1/2005 | Shaheen et al. | | 370/401 |
| 2005/0037728 A1* | 2/2005 | Binzel et al. | | 455/404.1 |
| 2005/0111630 A1* | 5/2005 | Potorny et al. | | 379/45 |
| 2005/0181805 A1* | 8/2005 | Gallagher | | 455/456.1 |
| 2005/0197775 A1* | 9/2005 | Smith | | 702/3 |
| 2005/0286466 A1* | 12/2005 | Tagg et al. | | 370/329 |
| 2005/0286473 A1* | 12/2005 | Stubbs | | 370/331 |
| 2006/0114885 A1* | 6/2006 | Baek et al. | | 370/352 |
| 2006/0221939 A1* | 10/2006 | Rosen et al. | | 370/352 |
| 2006/0280164 A1* | 12/2006 | Dickinson et al. | | 370/352 |
| 2006/0291488 A1* | 12/2006 | Naqvi et al. | | 370/401 |
| 2007/0021098 A1* | 1/2007 | Rhodes et al. | | 455/404.1 |
| 2007/0036282 A1* | 2/2007 | Engelke et al. | | 379/52 |
| 2007/0041373 A1* | 2/2007 | Lor et al. | | 370/356 |
| 2007/0117555 A1* | 5/2007 | Gewecke | | 455/415 |
| 2007/0121596 A1* | 5/2007 | Kurapati et al. | | 370/356 |
| 2007/0129108 A1* | 6/2007 | Swanburg et al. | | 455/556.1 |
| 2007/0207782 A1* | 9/2007 | Tran | | 455/414.1 |
| 2010/0304707 A1* | 12/2010 | Bolin | | 455/404.2 |

* cited by examiner

*Primary Examiner* — Nick Corsaro
*Assistant Examiner* — Mahendra R Patel
(74) *Attorney, Agent, or Firm* — Moazzam & Associates, LLC

(57) ABSTRACT

Techniques are disclosed which relate to the sending and receiving of multimedia files between mobile users and emergency response service operators while connected through a voice call. These devices are free to send any type of file through a direct connection without the need to hang up and call back just to see if the file was sent successfully. These methods work for a plurality of cellular and computer devices connected through a cellular network or other Internet Service Provider.

12 Claims, 3 Drawing Sheets

SHARING DATA WITH AN EMERGENCY RESPONSE SERVICE OVER A MOBILE NETWORK

BACKGROUND OF THE INVENTION

1. Field of the Invention

The present invention relates to telecommunications. More specifically, the present invention relates to the transfer of multimedia files between a mobile user and an emergency response service system during a voice call and without having to hang up via methods including connecting two cellular devices, a cellular device and a computer, two computers, or any other combination of electronic devices having a connection with the internet.

2. Background of the Invention

Cellular communication is an area of increasing technology and availability. At the end of 2005, a CTIA study showed that 69% of the United States population subscribed to a cellular telephone service. Cellular telephones work on a network of receiving towers that communicate with a central location. These towers are constantly being built in an effort to create a seamless network across the globe. Not only is this market more popular, but the technology is growing. Cellular companies have now opened data pipelines for delivering broadband internet straight to its customer's phones.

There are many applications that can benefit from the coupling of this trend with increasingly powerful and multi-functional mobile devices. Besides voice audio, the existing infrastructure permits transfer of audio, video, and other multimedia across cellular networks. Uses of this facility range from transmitting personal photographs between users to sending live video or location information to an emergency response service operator like E911. As phones become more like computers, users want to exchange more than mere conversations. Most new mobile phones are capable of performing many functions beyond basic telephony. Today's typical mobile phone is a fusion of a digital camera or camcorder, PDA, and digital music player, with room for add-ons like USB, Firewire, IR, or BLUETOOTH which gives them the ability to communicate with other devices independent of the cellular network. However, these phones are still essentially communication devices. It is not difficult to combine a digital camera with a music player, but mobile phone manufacturers have stepped up to the additional challenge of being able to integrate this functionality with the need to send and receive voice calls on demand.

The next step is to fuse these functions to communicate more than just voice. There exists much potential for new technology and function with an IP-enabled cellular network, which essentially assigns each cellular device an IP address just like a home computer when connected to the internet. This allows communication of pictures, film, and other data objects with any other device on the internet, including a home computer, thereby exploiting the functionality of the phone/camera/mp3 player. There exists an infrastructure that utilizes the availability of fast data-transfer protocols, standardized technologies, increasingly powerful wireless devices. It receives large amounts of investment by cellular operators in ensuring that their networks can implement these technologies. The IP-Multimedia System, or IMS, is essentially a system by which mobile operators can offer and charge for discrete services that are usually available on the internet, alongside currently offered services. This architecture works with any packet-switching network, and is IP-based. Therefore it has tremendous potential for services like Voice-over IP (VoIP), push-to-talk, videoconferencing, IM, presence information, etc. An example of a standardized signaling protocol is the Session Initiation Protocol, or SIP. SIP allows two devices in a network to find each other and open lines of communication easily, and is a significant part of IMS.

Uses of this facility range from transmitting personal photographs between users to sending live video or location information to an E911 operator. The mobile user could submit live video, location information, even vital bodily statistics (from a personal monitor or one in an ambulance) to convey more relevant information to the operator, therefore increasing the quality of the emergency response.

However, this existing infrastructure is not being utilized to its fullest potential. Currently, to send multimedia files to another mobile user, one is limited to either using the Multimedia Message Service (MMS), email, or via an instant messaging (IM) program that traverses the IM service provider network. MMS has its share of inconveniences. It cannot be used during a voice call, and MMS technology is fairly proprietary and non-scaleable. Also, the message has to traverse an MMS Center which is a temporary storage center for the message. The message is held there until the receiving device is located. The MMS Center will only hold the message for so long, and it can be unreliable. Email has some disadvantages as well. Though it has been the default option for sending files across the internet, most phones have limited email capabilities, and cannot access internet mail while engaged in a voice call. Sending files over instant messaging is even more burdensome. Both devices must be capable of running IM software, the software must run on the same IM protocol, and the software must have capability of sending and receiving files. Of the popular IM software programs that exist on mobile devices, most of the programs do not support file transfer.

What is needed is a method that allows multimedia files to be transferred from one user to another in the midst of a voice call between the two users, for instance between a 911 caller facing a vital emergency and the E911 operator. The current state of technology forces a user to hang up, send a multimedia file through one of the above mentioned services, like MMS, then call back to see if it the transfer was successful. Even if it was successful the transfer might not be instantaneous, requiring the both users to pause for an unknown amount of time to allow the MMS Center to forward the multimedia file.

Ideally, this process would involve minimal work on the user's part (with software taking care of all technical negotiations), and efficient employment of the existing infrastructure. When connected to a user in a voice call, the user should not need to know the IP address of the connected device. These devices are already connected via voice, and software should be able to find the IP address without user intervention.

SUMMARY OF THE INVENTION

The present invention is such a technique of transferring multimedia files from a mobile user to an E911 operator while in the midst of a voice call. While users are connected in the voice call, the mobile user can select on her phone to make a direct connection to the emergency operator's device in order to send a multimedia file. The operator can either accept or reject this offer to make a direct connection by making that selection on her system. If the operator accepts, the direct connection is opened and the caller can send any file she wants to the operator, whether it be a picture, sound, movie, or data file, all the while still talking on the phone.

Furthermore, the present invention works with the forms of communication that network carriers currently have, such as GSM and CDMA networks. This also allows mobile phones to connect to other devices on the internet that may not be cellular telephones, like computers or PDA's. The direct connection utilized between the two connecting devices can be secured as well using any of the current forms of encryption.

In one exemplary embodiment of the present invention, two users with cellular telephones on a GSM/GPRS network can send multimedia files to each other while connected in a voice call. So if the user facing the emergency is talking to the E911 dispatcher, and needs to send a picture of the perpetrator or the extent of fire damage, she can do so while on the phone. The user just establishes a direct connection, and she can then send any multimedia file she wants without having to hang up and call back to make sure the files were received correctly.

In another exemplary embodiment of the present invention, an accident victim in an ambulance is hooked up to a vital statistics monitor, which is connected to a GSM/GPRS network via IMS. This expands the usability of the previous embodiment because it broadens the scope of the system to that of non-phone devices like PDAs or computers. Since SIP and IMS capability is software based, the device easily obtains an IP address that can be seen and used to communicate with any existing IP-based computer that is part of the emergency responder system. The emergency responder in the ambulance connects via voice call to the emergency room in the hospital. He then establishes a direct connection in the background and sends over all vital statistics in any file format, while still communicating via voice with the hospital.

DETAILED DESCRIPTION OF THE INVENTION

Figure 1:
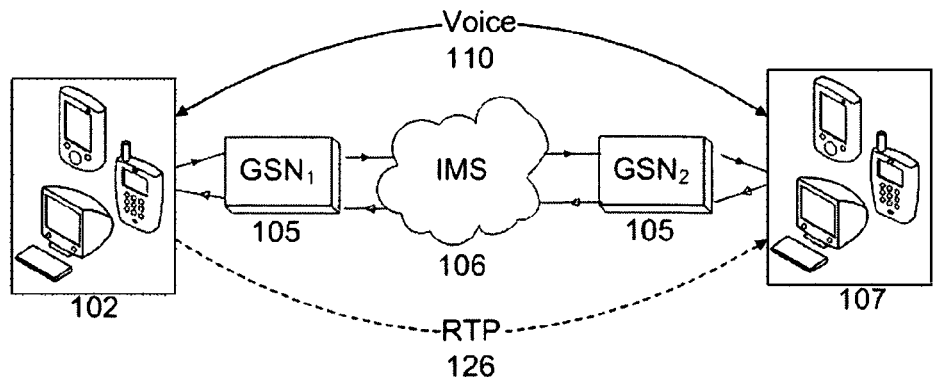
FIG. 1 shows an overview of the flow of data between two devices connected through both a voice connection and a file transfer session according to an exemplary embodiment of the present invention.

The present invention is a technique of sharing files with the emergency responder that one is connected to in a voice call as shown in FIG. 1. This is accomplished by establishing a direct IP connection between the two devices 102, 107 that are connected in a voice call 110 without the need for either device to hang up. Once a direct IP connection 126 is established, the users can send files back and forth to each other, such as pictures, sound clips, video, or any other data. One such method of making the direct IP connection possible is through the IP Multimedia Subsystem or IMS 106.

IMS 106 is a system by which mobile operators can offer and charge for discrete services, usually available on the internet, alongside currently offered services. These services can include music, games, and picture downloads, direct multimedia sessions, text messaging, or direct voice connections. An IMS enabled phone 102 can be assigned an IP address, which other devices on the internet 107 can use to connect to the phone through gateways 105. These other devices 107 can be computers, servers, other IMS enabled phones, or many others. This means a multimedia session between two IMS users, between an IMS user and a user on the Internet, and between two users on the Internet is established using the same protocol.

Figure 2:
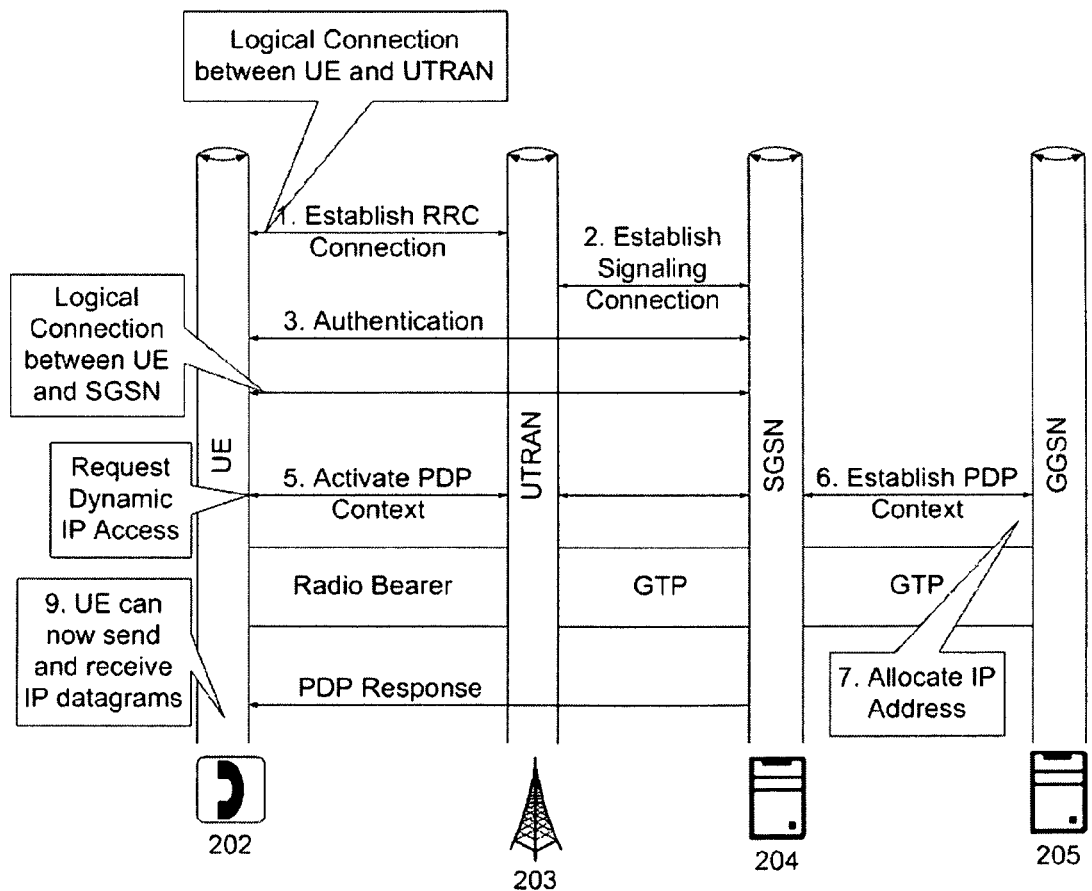
FIG. 2 shows the steps to obtaining an IP address for a cellular telephone connecting to IMS according to an exemplary embodiment of the present invention.

FIG. 2 shows the registration of a phone with IMS to receive an IP address. The user's device, or User Equipment, UE 202, receives its IP address from IMS upon request. From a mobile phone, this request is first sent from the UE 202 to the nearest tower 203. The tower 203 then relays the request to a server 204. The server 204 then makes a connection with the UE 202 where it obtains authentication. Once authenticated, the UE 202 then tries to open a Packet Delivery Protocol, or PDP, connection to the internet to receive an IP address. This request is relayed from the tower 203 to the server 204 and then to a gateway 205, where the PDP packet is sent to the internet. The internet allocates an IP address and relays that address back through the gateway 205, server 204, and tower 203. The PDP response is received by the UE 202, which then allows it to send and receive IP datagrams. An IP datagram is a packet of information, which gets translated into a PDP by the gateway 205 before reaching the UE 202.

Prior to the voice call, both of the UE's 202 are either SIP capable or IMS capable, which means they register to an IMS network and are given an IP address. After registration, the UE's 202 should be able to perform SIP based calls to each other and communicate with each other using their SIP addresses.

Figure 3:
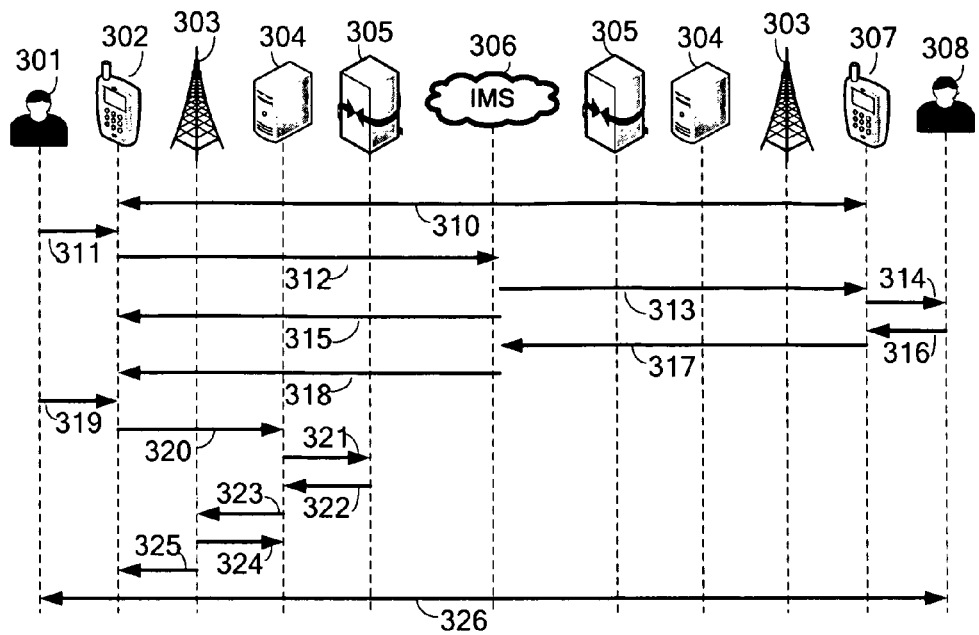
FIG. 3 shows the steps to establishing a direct PDP connection over a cellular network during a voice call according to an exemplary embodiment of the present invention.

The process of setting up the direct connection 326 is illustrated in FIG. 3. First, a voice call 310 is initiated between User A 301 and User B 308. Accompanying the request to set up the voice call 310 can be a request to check the parameters of each of the UE's 302, 307 to determine if they are capable of transferring data between the two. The instruction request 310 would be a request for a voice call and content call request.

Once the voice call 310 is setup, an SIP invitation 312 is sent from User A's UE 302 to User B's UE 307 inviting User B 308 to the IP address of User A's UE 302. User B 308 receives the request in the background, because there is no reason to have guaranteed bandwidth dedicated to it. The invitation 312 travels from User A's UE 302 to the nearest tower 303 where it is relayed to a server 304. The server 304 then relays invitation through a gateway 305 where it is translated into an IP datagram, a form IMS 306 can understand. Once it has been translated the IMS 306 finds the IP address of User B's UE 307. If IMS 306 is successful in finding the IP address of User B's UE 307 it sends a message 315 to User A's UE 302 immediately telling User A 301 that it is trying to connect to User B 308.

The invitation is relayed back through the gateway 305, server 304, and tower 303 nearest User B's UE 307 and User B 308 receives the invitation 314 with an option to accept or decline. If User B 308 declines, then the direct connection 326 is dropped but the voice call 310 still continues. If User B 308 accepts, then an acceptance message 317, 318 is sent back through the system to User A's UE 302. This acceptance message 317, 318 not only sends simply the message of acceptance but also tells User A's UE 302 what type(s) of media it is capable of receiving, such as video, audio, or pictures. The acceptance message 317, 318 is followed by a handshake between the two UE's 302, 307 over a primary PDP connection.

When User A 301 is ready to send a file or continuous video stream, User A 301 selects a file to send from a menu on the device 319. A message is sent to User B's UE 307 where User B 308 can either accept or reject the file. If User B 308 accepts, then a secondary PDP connection is established to send the media through a dedicated Quality of Service or QoS 320. User A's UE 302 sends a message to User B's UE 307 opening the secondary PDP connection for file transfer. User B's UE 307 negotiates with User A's UE 302 to find an acceptable speed of transfer and packet size. This is normally the fastest speed the devices can handle in their current location subject to provider limitations, such as the data plan User B 308 pays for. After this negotiation 321, 322 is complete the file is sent through and is received on User B's UE 307. Once the transfer is completed, the secondary PDP connection is dropped. These steps are repeated, starting with the file selection, for each file User A 301 wishes to send. User B 308 may select and send any file as well using the same steps as User A 301.

While transferring files, a user may need to send a sensitive file. If this is the case the user has the option of sending the file over a secure connection. User A 301 would simply select another option from his device to secure the connection for this or any number of files. As the file is transferred it will be encrypted on User A's UE 302 and decrypted on User B's UE 307. Their UE's 302, 307 can be equipped with any of the many forms of encryption that exist.

Figure 4:
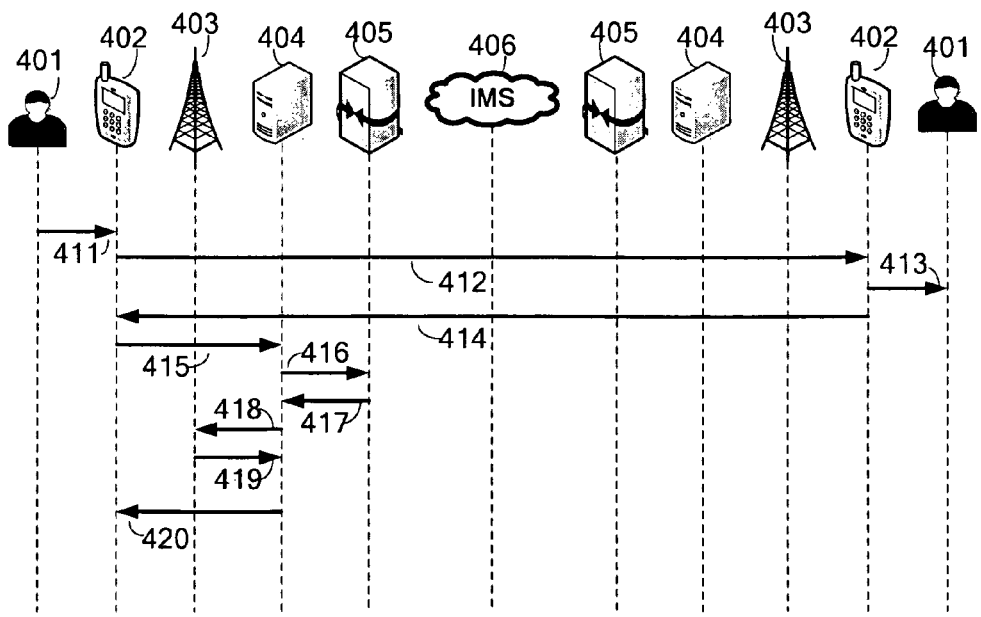
FIG. 4 shows the steps to disconnecting the direct connection over a cellular network during a voice call according to an exemplary embodiment of the present invention.

Once all the file transfers have completed, the session can be released, as shown in FIG. 4. User A 401 selects to release the session from a menu on the device 411. A message 412 is sent from User A's UE 402 to User B's UE 407 either asking for a release in the session, or forcing a release in the session. If User B 408 accepts the release, a message 414 is sent back to User A's UE 402 to close the connection. If the release is accepted or forced, User A's UE 402 closes the connection 415 with the server 404 immediately.

This technique works for many cellular networks, and has many applications. Once such embodiment of this invention is a mobile user's cellular telephone on a GSM/GPRS network connecting to a cellular telephone on a GSM/GPRS network, the latter phone operated by an emergency responder service operator. GSM stands for Global Standard for Mobile Communication, and is the technology behind many mobile carriers today. GPRS stands for General Packet Radio Service, and is the standard for sending data in packets across the GSM network, allowing multiple users to send data using the same channel.

The phones connect in a voice call over the GSM network. Once established, the first user pushes the keys on his cellular telephone to send a request to the 911 operator to initiate the file sharing session. This request is sent through the tower to a GPRS server known as a Serving GPRS Support Node or SGSN. From the SGSN the request is relayed through a GPRS gateway known as a Gateway GPRS Support Node or GGSN. Once the request is received by the 911 operator's cellular telephone, she can opt to accept it or reject it. If accepted, the cellular telephones attempt to connect to each other using the GPRS Tunneling Protocol or GTP, the defining IP protocol for the GPRS system. GTP is used for the primary PDP connection, which is the basic constant connection for sending requests and the secondary PDP connection, which opens once a file starts transferring.

Figure 5:
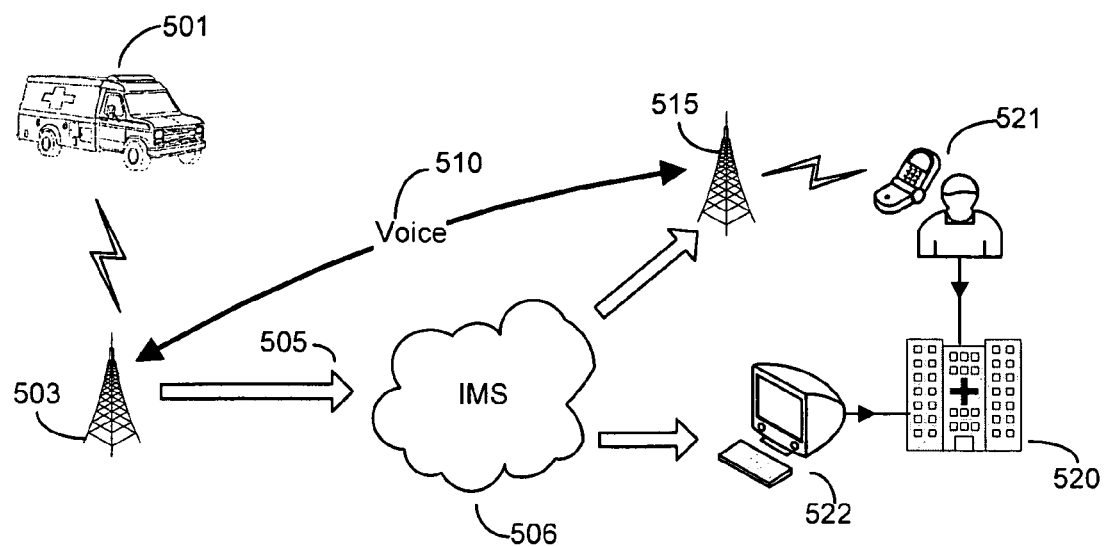
FIG. 5 shows an overview of the invention when applied to an ambulance communicating with a hospital, according to an exemplary embodiment of the present invention.

FIG. 5 shows another embodiment of the present invention that uses multiple devices with the same connection to transfer information from an emergency vehicle to a hospital. An ambulance 501 transporting a critically wounded patient is traveling towards the hospital 520. The ambulance has connectivity to the wireless tower 503, and the emergency responder in the ambulance is in a voice call 510 with the emergency room doctor 521 via the wireless tower. The ambulance also contains a vital stats monitor hooked up to the patient, and this device is also hooked up to the communications system of the ambulance. When the emergency responder wants to send vital stats information (audio, images, proprietary file formats are supported) to the hospital, he initiates the process. The SIP-enabled computer aboard the ambulance traverses the tower 503, and enters the IMS 506 as an IP-based packet of information 505. This request reaches either the doctor's wireless device 521 or a SIP-enabled computer 522 that is part of the hospital's network. The request is approved, and a direct IP session is initiated between the ambulance and the hospital that traverses the IMS. The primary PDP direct connection is established, and the information is sent across. All this occurs while there is still voice communication between the ambulance and the hospital.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A network system for sharing files, comprising:
   an IP Multimedia Subsystem (IMS) to provide a primary cellular data connection between engaged devices, the engaged devices including at least one device that is engaged in a voice communication with another device that is part of an emergency response service, the voice communication occurring over a cellular voice connection, the IMS to further provide a secondary cellular data connection to share a file between the engaged devices; and
   a plurality of units capable of acting as a gateway between the devices and an IP network, wherein the plurality of units initiate, maintain, and terminate the cellular data connections while the devices are engaged in voice communication;
   wherein data connection requests between the engaged devices are initiated using a Session Initiation Protocol (SIP) or Packet Delivery Protocol (PDP); and
   wherein the PDP connection between the engaged devices uses the primary cellular data connection to send and receive a plurality of file requests and the secondary cellular data connection to send and receive a plurality of files.

2. The network system in claim 1, wherein the devices are mobile phones, computers, PDAs, or any combination of such devices.

3. The network system in claim 1, wherein the devices connect via a GSM, CDMA, TDMA or equivalent mobile network.

4. The network system of claim 1, wherein the second cellular data connection uses the Realtime Transfer Protocol (RTP).

5. The network system of claim 1, wherein the second cellular data connection is used to send a plurality of multimedia files of any type.

6. The network system of claim 5, wherein the multimedia files are related to providing information to an emergency response service.

7. The multimedia files in claim 6, wherein the information provided includes vital bodily statistics for patients involved in emergencies.

8. A network system for improved E911 response, comprising:
- an IP Multimedia Subsystem (IMS) to provide a primary cellular data connection between engaged devices, the engaged devices including at least one device that is engaged in a voice communication with another device handled by an emergency response service operator, the voice communication occurring over a cellular voice connection, the IMS to further provide a secondary cellular data connection between the engaged devices to transfer a plurality of multimedia files to the emergency response service across the IMS, and
- a plurality of units capable of acting as a gateway between either device and an IP network, wherein the plurality of units initiate, maintain, and terminate the cellular data connections using the SIP, PDP and RTP protocols, while the devices are engaged in voice communication;
- wherein data connection requests between the engaged devices are initiated using a Session Initiation Protocol (SIP) or Packet Delivery Protocol (PDP); and
- wherein the PDP connection between the engaged devices uses the primary cellular data connection to send and receive a plurality of file requests and the secondary cellular data connection to send and receive a plurality of files.

9. The network system in claim 8, wherein the devices are mobile phones, computers, or PDAs that connect via a GSM, CDMA, TDMA or an equivalent mobile network.

10. The network system in claim 8, wherein the multimedia files are related to providing emergency-related information to an emergency response service.

11. The multimedia files in claim 10, wherein the information provided includes vital bodily statistics for patients involved in emergencies.

12. A method for improved emergency response, comprising the steps of:
- establishing a cellular voice connection between a plurality of communications devices, wherein the receiving device is operated by an emergency response service, and all devices are either SIP enabled or connected to SIP-enabled gateways;
- assigning an IP address to the devices using an IP Multimedia Subsystem;
- establishing a primary cellular direct data connection between the sending device and the receiving device, where this request and response are transmitted using the SIP or PDP protocols;
- establishing a secondary cellular direct data connection over an appropriate file transfer protocol from the sending IP to the receiving IP; and
- sending an emergency-related data through the secondary cellular data connection, where both cellular data connections are established while the devices maintain the cellular voice connection;
- wherein the primary cellular data connection between the communications devices is used to send and receive a plurality of file requests.

* * * * *